(12) United States Patent
Moreau et al.

(10) Patent No.: US 11,878,588 B2
(45) Date of Patent: Jan. 23, 2024

(54) METHOD AND DEVICE FOR ACTIVATING A FUNCTION SUBJECT TO AUTHORIZATION IN A VEHICLE COMPRISING A SYSTEM OF DIGITAL REAR-VIEW MIRRORS

(71) Applicant: PSA AUTOMOBILES SA, Poissy (FR)

(72) Inventors: Charles Moreau, Rambouillet (FR); Loic Bayard, Les Ulis (FR); Pierre Quinio, Versailles (FR); Eric Eledut, Chatenay Malabry (FR); Maxime Savignac, Versailles (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 18/041,375

(22) PCT Filed: Jul. 5, 2021

(86) PCT No.: PCT/FR2021/051224
§ 371 (c)(1),
(2) Date: Feb. 10, 2023

(87) PCT Pub. No.: WO2022/064111
PCT Pub. Date: Mar. 31, 2022

(65) Prior Publication Data
US 2023/0211663 A1 Jul. 6, 2023

(30) Foreign Application Priority Data

Sep. 22, 2020 (FR) ........................................ 2009583

(51) Int. Cl.
*B60K 35/00* (2006.01)
*B60R 1/26* (2022.01)

(52) U.S. Cl.
CPC ................ *B60K 35/00* (2013.01); *B60R 1/26* (2022.01); *B60K 2370/1438* (2019.05);
(Continued)

(58) Field of Classification Search
CPC ............ B60K 35/00; B60K 2370/1438; B60K 2370/736; B60K 2370/739; B60K 2370/779; B60R 1/26; B60R 2300/8046
See application file for complete search history.

(56) References Cited

U.S. PATENT DOCUMENTS 9,348,492 B1 * 5/2016 Penilla ................ G06F 3/04842
2014/0303842 A1 * 10/2014 Boelter ............ B60W 50/0098
701/36
(Continued)

FOREIGN PATENT DOCUMENTS

DE 102012004640 A1 * 9/2013 ............. B60K 35/00
DE 102013016341 A1 4/2015
(Continued)

OTHER PUBLICATIONS

Espacenet English Translation of Description of DE102012004640A1 (Year: 2013).*
(Continued)

*Primary Examiner* — James J Lee
*Assistant Examiner* — Andrew Sang Kim
(74) *Attorney, Agent, or Firm* — Sandberg Phoenix & von Gontard P.C.

(57) ABSTRACT

A method and a device are disclosed for activating a function subject to authorization in a vehicle comprising a system of digital rear-view mirrors with at least first and second touch screens, arranged on the driver's and passenger's side, respectively. The vehicle comprises members suitable for providing at least one function subject to authorization. The method comprises detection, by one of the members, of an
(Continued)

action by a person that requires the activation of a function subject to authorization; —transmission, from the member to the system of digital rear-view mirrors, of information relating to the detection; —receipt, from the system of digital rear-view mirrors, of the information relating to the detection originating from the member, —display, on one of the touch screens, of a notification comprising the function subject to authorization, and; an interaction zone suitable for receiving either an agreement or a refusal from the driver and/or the front passenger.

8 Claims, 4 Drawing Sheets

(52) U.S. Cl.
CPC .. *B60K 2370/736* (2019.05); *B60K 2370/739* (2019.05); *B60K 2370/779* (2019.05); *B60R 2300/8046* (2013.01)

(56) References Cited

U.S. PATENT DOCUMENTS

| | | |
|---|---|---|
| 2018/0312114 A1 | 11/2018 | Inoue |
| 2019/0375409 A1* | 12/2019 | Hunt ..................... G01C 21/36 |
| 2021/0149397 A1* | 5/2021 | Shin ..................... G06V 10/764 |

FOREIGN PATENT DOCUMENTS

| | | |
|---|---|---|
| EP | 2822814 A1 | 1/2015 |
| FR | 3035073 A1 | 10/2016 |

OTHER PUBLICATIONS

International Search Report for corresponding PCT/FR2021/051224 dated Sep. 15, 2021.
Written Opinion for corresponding PCT/FR2021/051224 dated Sep. 15, 2021.

* cited by examiner

METHOD AND DEVICE FOR ACTIVATING A FUNCTION SUBJECT TO AUTHORIZATION IN A VEHICLE COMPRISING A SYSTEM OF DIGITAL REAR-VIEW MIRRORS

CROSS-REFERENCE TO RELATED APPLICATIONS

This application is the US National Stage under 35 USC § 371 of International Application No. PCT/FR2021/051224, filed 5 Jul. 2021 which claims the priority of French App. No. 2009583 filed on 22 Sep. 2020, the content (text, drawings and claims) of both being incorporated herein by way of reference.

BACKGROUND

Disclosed is a man-machine interface of a vehicle, and more particularly a system of digital rear-view mirrors that facilitates control of certain vehicle functions.

It is known to equip a motor vehicle with one or more digital rear-view mirrors comprising a screen displaying images of the outside environment captured by cameras. These devices are beginning to replace the traditional reflective rear-view mirrors placed on either side of the front, left and right doors.

EP 2 822 814 describes a vehicle comprising a digital rear-view mirror, in particular an exterior and/or side rear-view mirror, that comprises at least one touch screen displaying images captured by a camera placed outside the vehicle. A representation parameter of the display device, in particular the brightness and/or the contrast and/or a color parameter, can be set on the touch screen.

These new functional settings dedicated to digital rear-view mirrors are in addition to the other functional settings of the vehicle, and in particular the functions subject to authorization, that already exist. This also leads to an additional user interaction interface. This multiplicity of interfaces contributes to the increase in vehicle manufacturing costs by adding numerous components (buttons, wiring, etc.). This multiplicity also contributes to the complexity of use for users.

SUMMARY

We have provided a solution for simplifying activation of a function subject to authorization in a vehicle while reducing the manufacturing cost of the vehicle.

More precisely, to this end we propose a method for activating a function subject to authorization in a vehicle comprising a system of digital rear-view mirrors. The vehicle comprises a driver's side and a passenger's side, and comprises members suitable for providing at least one function subject to authorization. The system of digital rear-view mirrors comprising at least:
  a first touch screen, placed on the driver's side, dedicated to displaying the outside environment on the driver's side;
  a second touch screen, placed on the front passenger's side, dedicated to displaying the outside environment on the passenger's side.
The method comprises the following steps:
  detection, by one of the members, of an action by a person that requires the activation of a function subject to authorization,
  transmission, from said the member to the system of digital rear-view mirrors, of information relating to the detection,
  receipt, from the system of digital rear-view mirrors, of the information relating to said detection originating from the member,
  displaying, on one of the touch screens, a notification comprising the function subject to authorization and an interaction zone suitable for receiving either an agreement or a refusal from the driver and/or the front passenger.

Thus, when a user wishes to activate a function subject to authorization, for example opening of a rear window by a child, the user acts on a member associated with the function subject to authorization, for example the button for opening the window. This member, which is capable of detecting an activation request, sends the request to the system of digital rear-view mirrors, which displays, on one of the touch screens, a notification comprising the function subject to authorization and an interaction zone suitable for receiving either an agreement or a refusal from the driver and/or the front passenger. The driver and/or the front passenger can then simply accept or refuse the request. This prevents the driver from having to activate the authorization on a button, which is often difficult to access while driving. In addition, this button is generally not accessible by the front passenger, who then cannot give authorization and relieve the driver of this task. In cases where the activation of the function is available via an interface of an on-board computer, access to this activation is not easy: it must be found in the menu tree.

Advantageously, the method further comprises a step for acquiring a command from the driver and/or front passenger on the touch screen, and a step for transmitting information relating to the interaction between the driver and/or front passenger and the touch screen from the system of digital rear-view mirrors to the member. When the transmitted information comprises an agreement, the member activates the function.

Thus, the driver and/or the front passenger can give authorization and activate the function very simply after interacting with the touch screen of the system of digital rear-view mirrors.

Advantageously, the member is an opening, a multimedia system, or an air conditioning adjustment system.

"Opening" refers to any member of the vehicle that opens, therefore that has at least two positions, one closed and one open (partially open, deployed, or on). For example, without being limiting, an opening is an element chosen from a door, a window, a trunk, a hood, a lid or a hatch closing a storage space (for example a glove box), an airbag, a seat belt, lighting, etc.

The method applied to several functions subject to authorization allows authorization requests and acceptances or refusals very simply, the request being transferred by the concerned members.

Advantageously, the function subject to authorization is an opening, a closing, a level and/or position adjustment, a speed adjustment, an activation, and/or an extinction.

The method applied to several functions subject to authorization allows authorization requests and acceptances or refusals very simply, the request as well as the interaction zone being displayed on at least one touch screen of the system of digital rear-view mirrors that is easily accessible to the driver and/or a front passenger.

Advantageously, the display of the notification is on the driver's side or the passenger's side, depending on whether the member is on the driver's side or the passenger's side of the vehicle.

Thus, the person most concerned is notified and can give an agreement or a refusal.

Advantageously, the method further comprises the steps of determining a driving situation of the vehicle from vehicle data, and of suspending the display according to the determined driving situation.

In certain driving situations, for example in the event of an overtaking maneuver initiated by the driver, it is useful not to display, or to temporarily suspend, the notifications.

Advantageously, in one embodiment, the display is in the watermark or in the margin of the image. In certain driving situations, it is useful for the display on the touch screens of the system of digital rear-view mirrors mainly to concern the rear view. In other driving situations, for example in a parking lot, the display of the notification and of the interaction zone can be more predominant than that of the display of the rear view.

A device is also disclosed that comprises a memory associated with at least one processor configured to implement the method.

A vehicle is disclosed comprising the device.

A computer program is disclosed that comprises instructions suitable for executing the steps of the method when the program is executed by at least one processor.

DESCRIPTION OF THE FIGURES

Other features and advantages of the method will emerge from the description of the non-limiting embodiments of the method below, with reference to the appended figures, in which.

DETAILED DESCRIPTION

Figure 1:
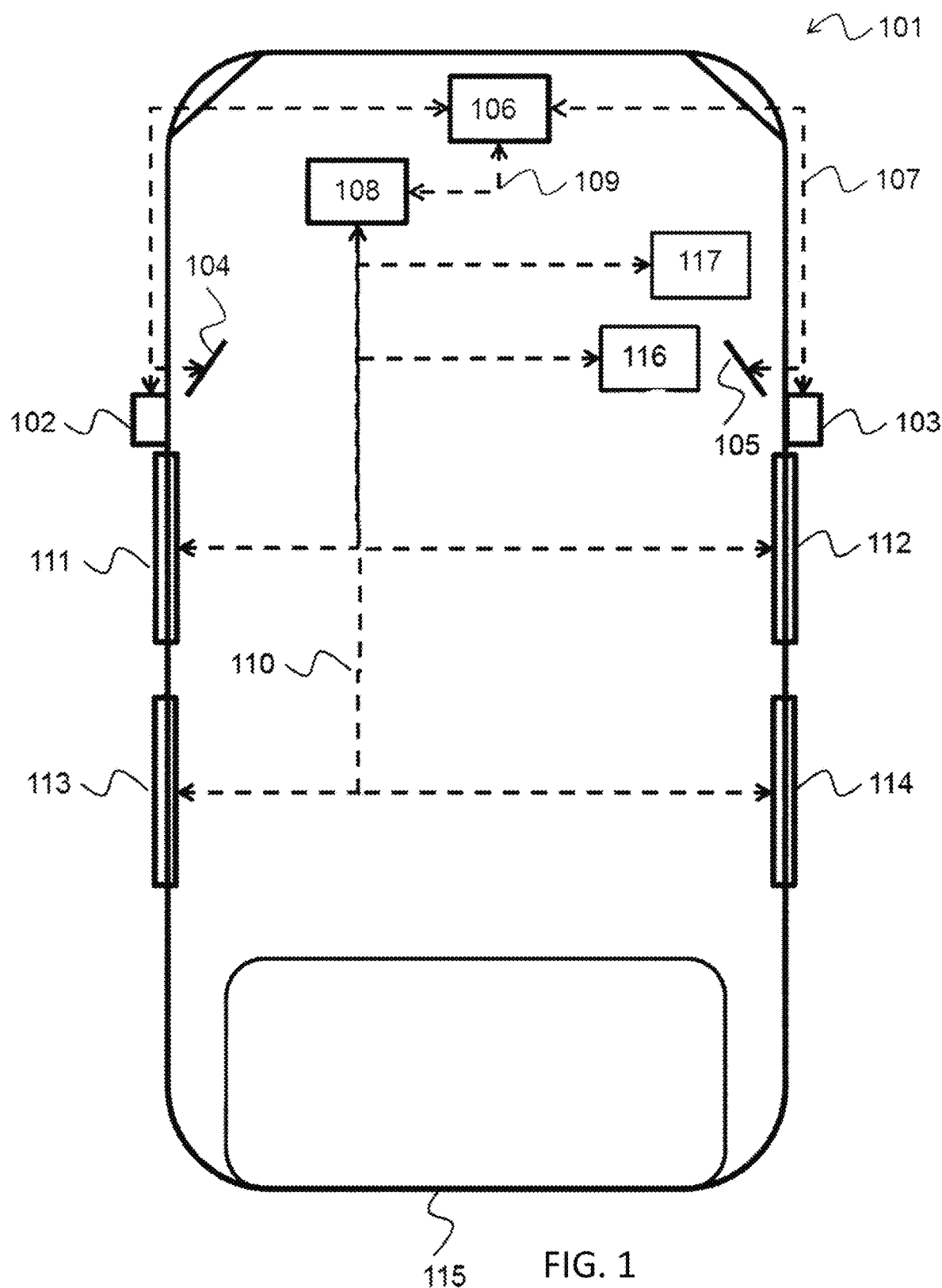
FIG. 1 schematically illustrates a vehicle comprising a digital rear-view mirror device.

FIG. 1 shows a vehicle 101 comprising a system of digital rear-view mirrors. The vehicle comprises a driver's side and a passenger's side. The system of digital rear-view mirrors comprises at least one camera 102, 103 capturing images from outside the vehicle, a first touch screen 104 placed on the driver's side, a second touch screen 105 placed on the passenger's side, and a computer 106. A communication channel 107, for example a CAN network, connects these components.

In the embodiment of FIG. 1, the vehicle comprises a first camera 102, on the driver's side, and a second camera 103 on the passenger's side.

In another embodiment, not illustrated, the vehicle comprises a single camera that is advantageously placed on the roof, making it possible to capture images of the outside environment of the vehicle.

The computer 106 can also be connected to a second computer 108 using a second communication channel 109. The second computer 108, using a third communication channel 110, can be connected to members controlling comfort and/or safety functions. These functions may be subject to authorization.

Adjusting comfort and/or security functions allows a user to adjust functions of an opening. "Opening" refers to any member of the vehicle that opens, and which therefore has at least two positions, one closed and one open (partially open, deployed, or on). For example, without being limiting, an opening is an element chosen from a door or window 111, 112, 113, 114, a trunk 115, a hood, a lid or a hatch closing a storage space (for example a glove box), an airbag 116, a seat belt, lighting, etc. The adjustment of comfort and/or security functions also allows a user to adjust functions of a multimedia system (for example, launching a video and/or audio, the sound environment, etc.), an air conditioning control system (for example, temperature, ventilation, etc.), etc.

Figure 2:
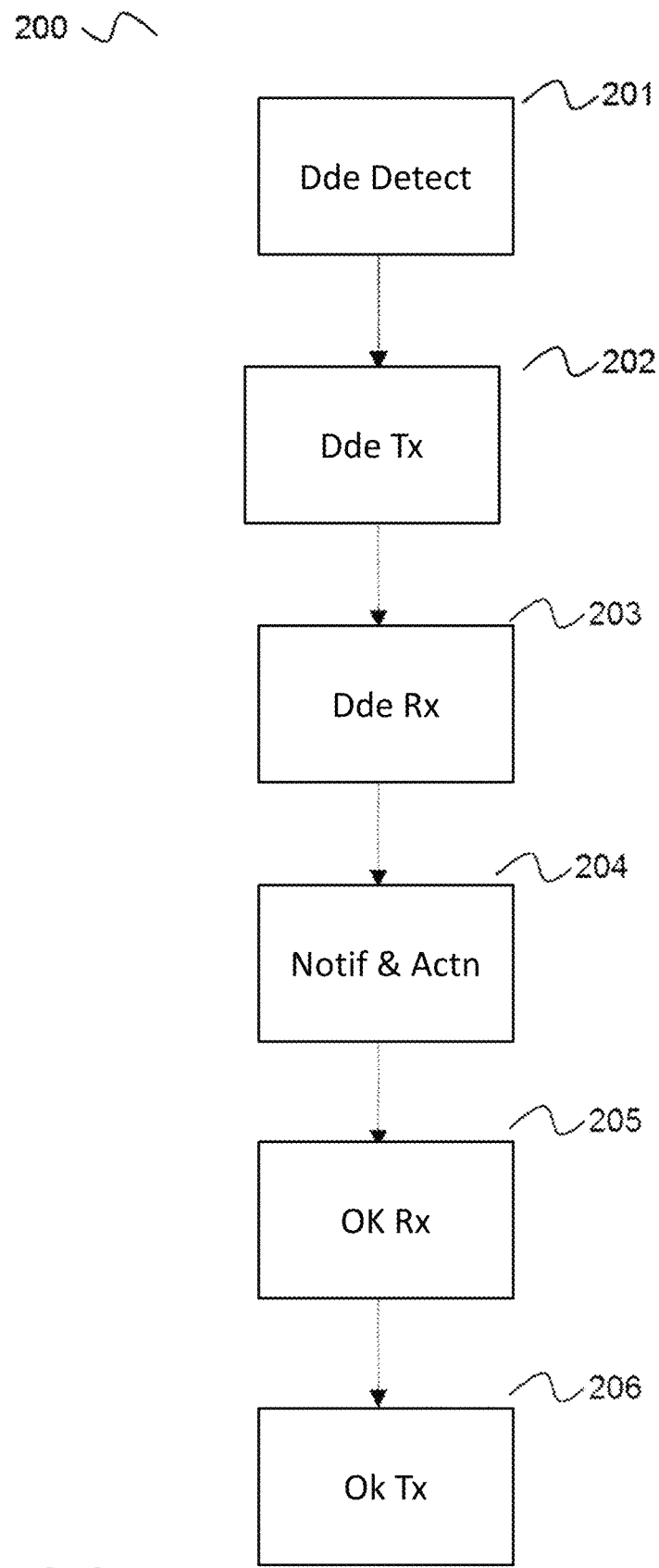
FIG. 2 schematically illustrates a method for activating a function subject to authorization in a vehicle comprising a system of digital rear-view mirrors.

FIG. 2 schematically illustrates a method 200 for activating a function subject to authorization in a vehicle comprising a system of digital rear-view mirrors.

Step 201, Dde Dtect, is a step of detection, by one of the members (non-limitingly 113, 114, 115, 116) suitable for providing at least one function subject to authorization, of an action by a person that requires the activation of a function subject to authorization. For example, in one operating mode, a child wishes to open his right rear door 114 by manipulating the door handle. In this example, the member is the rear door, or more particularly the DCPC (door control panel computer), and by default for safety reasons, the function of opening the rear doors 113, 114 is prohibited.

In step 202, Dde Tx, the member that has detected an action requiring the activation of a function subject to authorization transmits information relating to said detection to the system of digital rear-view mirrors. Returning to the example above, the DCPC transmits information relating to the detection of a request to open the right rear door.

In step 203, Dde Rx, the system of digital rear-view mirrors, or any other device responsible for implementing the method, receives information relating to the detection. Returning to the example above, the system of digital rear-view mirrors receives the information relating to the detection of a request to open the right rear door.

In step 204, Notif & Actn, the system of digital rear-view mirrors displays, on at least one of the touch screens of the system of digital rear-view mirrors, a notification and an interaction zone suitable for receiving either an agreement or a refusal from the driver and/or the front passenger. Advantageously, the notification comprises a message indicating the request for authorization of the function to be activated. Continuing the example above, the system of digital rear-view mirrors may display the message on the front passenger side touch screen 105: "Authorize right rear door to open?" and also display an interaction zone with two boxes, one comprising the message "YES," the other comprising the message "NO."

In step 205, Rx OK, the system of digital rear-view mirrors monitors the interaction zone and acquires a command from the driver and/or the front passenger on the touch screen. Continuing the example above, the passenger clicks on the "YES" part of the interaction zone. The system of digital rear-view mirrors acquires authorization information for the right rear door opening function.

In step 206, Tx OK, the system of digital rear-view mirrors transmits information to the member relating to the interaction between the driver and/or the front passenger and the touch screen. Returning to the example above, the message transmits the authorization information for the right rear door opening function. Thus, when the DCPC receives the information, it can activate the door opening function and the door then opens.

In one operating mode, the detection by one of the members of an action by a person that requires the activation of a function subject to authorization is a detection of a request for opening, closing, level and/or position adjustment, speed adjustment, activation, and/or extinction. The information relating to the detection comprises an opening, a closing, a level and/or position adjustment, a speed adjustment, an activation, and/or an extinction.

In another operating mode, if an adult is detected in the front passage seat, requests for activation of a function subject to authorization are displayed on the front passenger's touch screen.

In another operating mode, the display can be suspended according to the phase of life of the detected vehicle. For example, in the event of overtaking, reversing, changing lanes, etc., the method will avoid displaying a notification. In another example, if the vehicle is driving in autonomous mode, that is to say, without any action required on the part of a driver to drive the vehicle, the notifications can be displayed in the driving situations mentioned in the previous example. In another example, the display will be very succinct, not highly visible to the driver because the display will be in a watermark or margin of the image.

Figure 3:
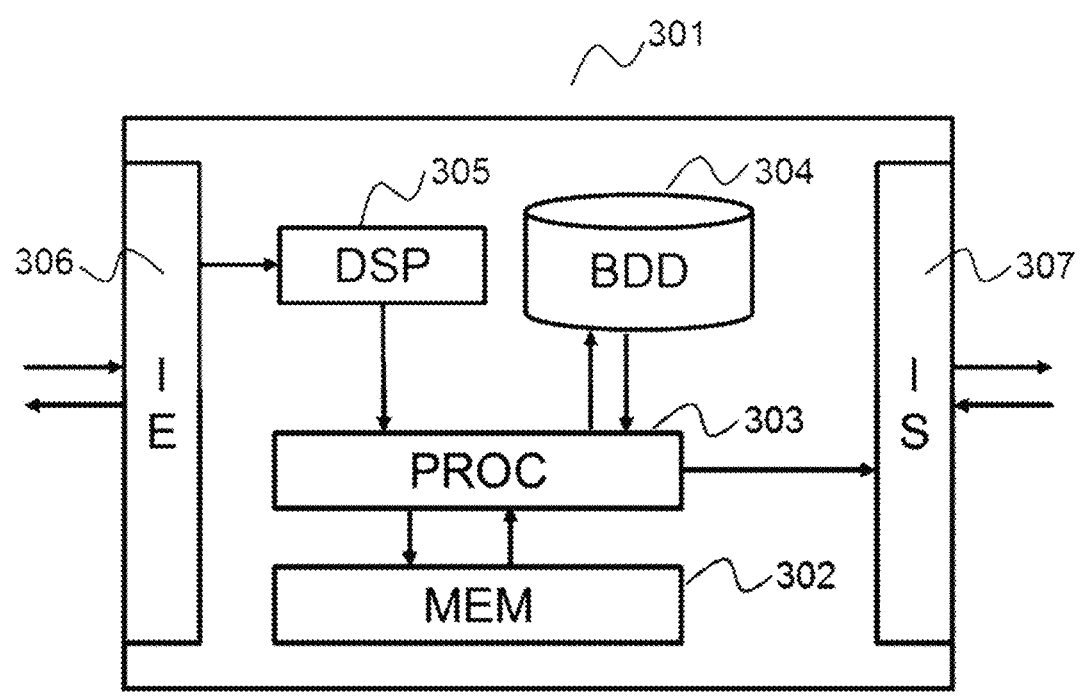
FIG. 3 schematically illustrates a device for activating a function subject to authorization in a vehicle comprising a system of digital rear-view mirrors.

FIG. 3 shows an example of a device 301 included in the vehicle, in a network ("cloud") or on a server. This device 301 can be used as a centralized device in charge of at least certain steps of the method described above with reference to FIG. 2. In one embodiment, it corresponds to a computer of the system of digital rear-view mirrors.

The device 301 is included in the vehicle.

This device 301 may take the form of a box comprising printed circuits for any type of computer or even for a mobile telephone ("smartphone").

The device 301 comprises a random access memory 302 for storing instructions for the implementation by a processor 303 of at least one step of the method as described above. The device also comprises a mass memory 304 for storing data that are intended to be kept after the method has been implemented.

The device 301 may further comprise a digital signal processor (DSP) 305. This DSP 305 receives data in order to format, demodulate, and amplify these data in a manner that is inherently known.

The device 301 also comprises an input interface 306 for receiving the data implemented by the method and an output interface 307 for transmitting the data implemented by the method.

Figure 4:
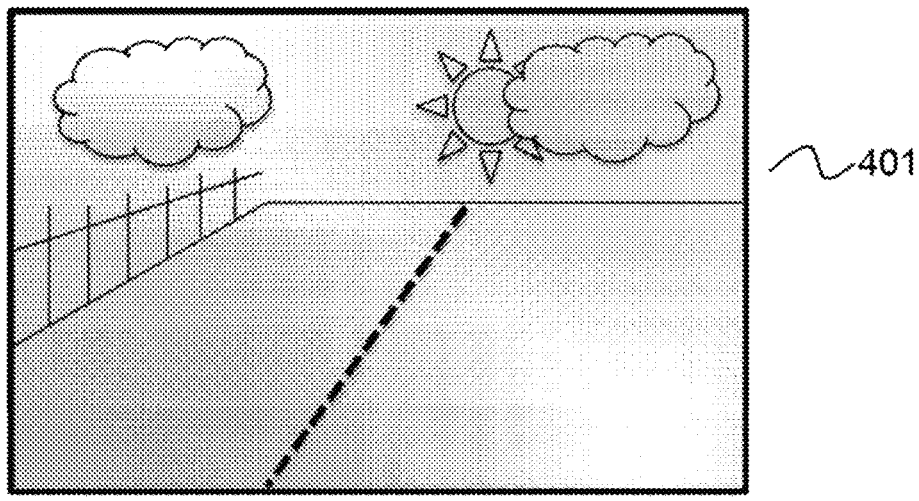
FIG. 4 schematically illustrates a first example of the display of a screen of the system of digital rear-view mirrors.

FIG. 4 schematically illustrates a view 401 of the driver's side touch screen when no action is detected that requires the activation of a function subject to authorization. The screen displays at least part of the image captured by at least one of the cameras 102, 103.

Figure 5:
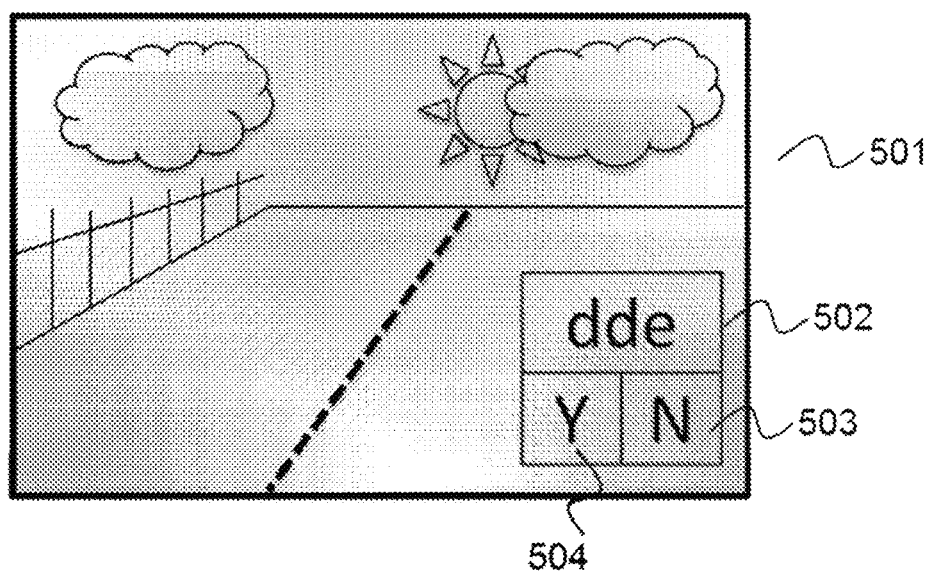
FIG. 5 schematically illustrates a second example of the display of a screen of the system of digital rear-view mirrors.

FIG. 5 schematically illustrates a view 501 of the driver's side touch screen during the display of a notification 502 comprising a function subject to authorization and an interaction zone suitable for receiving either an agreement 504 or a refusal 503 from the driver.

The claimed invention is not limited to the embodiments described above by way of example, but rather it extends to other variants.

Thus, an embodiment has been described above in which the transmission of information relating to the detection and/or the transmission of information relating to the interaction between the driver and/or the front passenger and a touch screen were ensured by a wired link according to a CAN protocol. Of course, these transmissions can be ensured by any type of communication technique, such as optical or radiofrequency communications according to other protocols.

The invention claimed is:

1. A method for activating a function subject to authorization in a vehicle comprising a system of digital rear-view mirrors, said vehicle comprising a driver side and a passenger side, and comprising members suitable for supplying at least one function subject to authorization, said system of digital rear-view mirrors comprising:
   at least one camera positioned to capture images of an outside environment of the vehicle,
   a first touch screen, placed on the driver side, said first touch screen being connected to the at least one camera over a communication channel; said first touch screen being adapted to display the outside environment on the driver's side, and
   a second touch screen, placed on the front passenger side, said second touch screen being connected to the at least one camera over said communication channel; said second touch screen being adapted to display the outside environment on the passenger's side,
said method comprising the following steps:
   detecting, by one of said members, an action by a person that requires the activation of a function subject to authorization,
   transmitting, from said member to the system of digital rear-view mirrors, information relating to said detection,
   receiving, by said system of digital rear-view mirrors, the information relating to said detection originating from said member,
   displaying, on one of said touch screens, a notification regarding said function subject to authorization and an interaction zone suitable for receiving either an agreement or a refusal from the driver and/or the front passenger, wherein the display of the notification is on the driver's side or the passenger's side, depending on whether the member is on the driver's side or the passenger's side of the vehicle,
   acquiring a command from the driver and/or the front passenger on said touch screen,
   transmitting, from the system of digital rear-view mirrors to said member, information relating to the interaction between the driver and/or the front passenger and said touch screen,
wherein, when the transmitted information comprises an agreement, said member activates the function.

2. The method according to claim 1, wherein said member is an opening, a multimedia system, or an air conditioning adjustment system.

3. The method according to claim 1, wherein said function subject to authorization is an opening, a closing, a level and/or position adjustment, a speed adjustment, an activation, and/or an extinction.

4. The method according to claim 1, wherein the method further comprises the steps of:
   determining a driving situation of the vehicle from vehicle data,
   suspending the display according to the determined driving situation.

5. The method according to claim 1, wherein said display is a watermark or is in the margin of the image.

6. A device for activating a function subject to authorization in a vehicle comprising a system of digital rear-view mirrors, said device comprising a memory associated with at least one processor configured to implement the method according to claim 1.

7. A vehicle comprising the device according to claim 6.

8. A computer program product comprising a non-transitory computer readable storage medium having instructions stored therein suitable for executing the steps of the method according to claim 1, wherein said program is executed by at least one processor.

* * * * *